United States Patent
Krauer et al.

[15] 3,666,652
[45] May 30, 1972

[54] TITRATION POTENTIAL MEASUREMENT

[72] Inventors: Werner Krauer; Alfred Adalbert Martinelli, both of Zurich; Friedrich Oehme, Bassersdorf, all of Switzerland

[73] Assignee: Polymetron Ltd., Glattbrugg, Switzerland

[22] Filed: Mar. 18, 1970

[21] Appl. No.: 20,673

[30] Foreign Application Priority Data

Mar. 21, 1969 Switzerland..................................4280

[52] U.S. Cl......................204/195 R, 204/1 T, 204/195 T, 324/29, 324/30
[51] Int. Cl........................................................G01n 27/08
[58] Field of Search..............204/195 T, 195 R, 1 T; 324/29, 324/30 R, 30 B

[56] References Cited
UNITED STATES PATENTS

| 2,884,366 | 4/1959 | Anderson et al........................204/195 |
| 3,349,012 | 10/1967 | Solomons..................................204/1 |
| 3,424,975 | 1/1969 | Sanford et al............................324/30 |

Primary Examiner—G. L. Kaplan
Attorney—Robert W. Fiddler

[57] ABSTRACT

Titration potential measurement providing means including both method and apparatus for eliminating the interference of gas accumulations in the titrated sample to interfere with accuracy of potential measurement. This is accomplished by flowing the titrated sample through a potential measuring chamber having an upper and lower flow path for the titrated sample, with two spaced electrodes extended into the lower flow path, whereby gas accumulations in the sample will rise to the upper flow path, while measurements are made in the relatively gas free portions of the sample in the lower flow path.

3 Claims, 4 Drawing Figures

Patented May 30, 1972 3,666,652
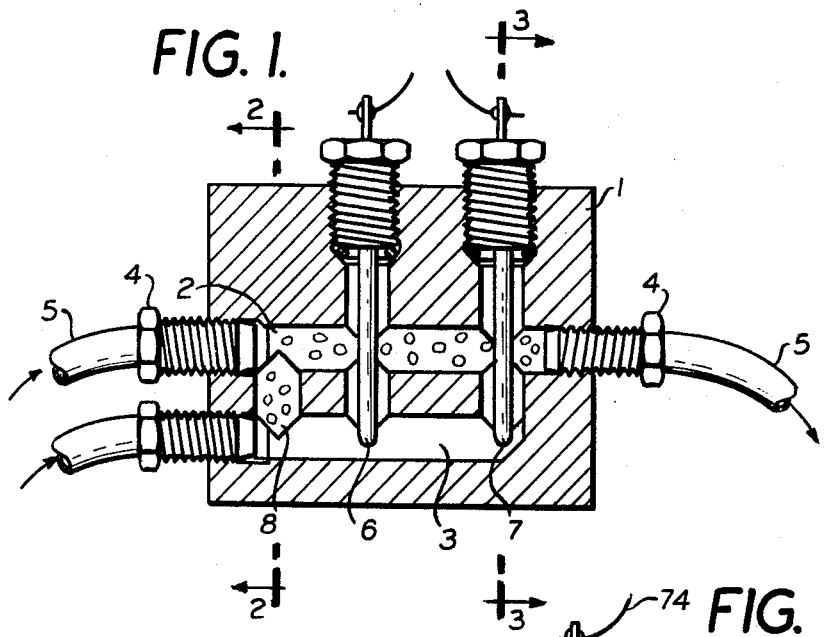
FIG. 1.
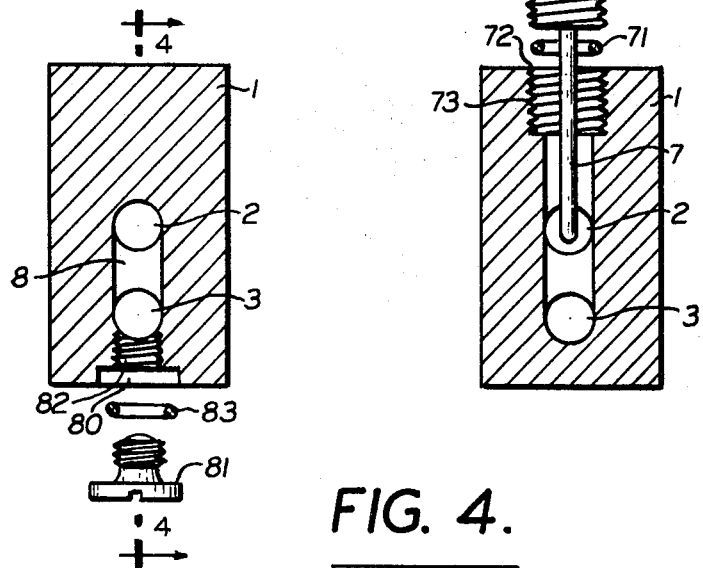
FIG. 2.
FIG. 3.
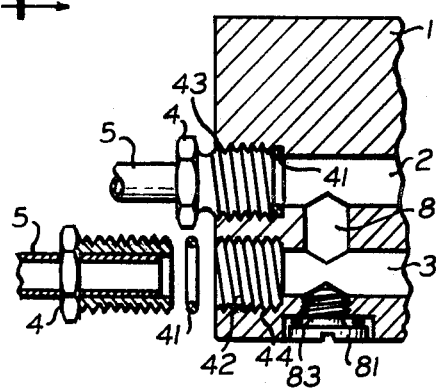
FIG. 4.
INVENTORS
WERNER KRAUER
ALFRED MARTINELLI
FRIEDRICH OEHME
BY Robert W. Fiddler
ATTORNEY.

TITRATION POTENTIAL MEASUREMENT

BACKGROUND OF THE INVENTION

This invention relates to the art of solution concentration monitoring, and more particularly to an improved method and apparatus for measuring potential in a sample of fluid to be analyzed.

In the continuous titration of liquids to be analyzed for the concentration in them of certain chemical compounds, a small component stream is branched off by means of a pump or any other apparatus capable of delivering a constant stream of liquid and is admixed with a similarly constant stream of a titrating agent. The result of titration is preferably determined potentiometrically, for example by means of a measuring chain for measuring the pH-value of the Redox potential which dips into the mixture of sample and titrating agent. In industrial applications, a measuring chain of this kind is preferably made up of a separate measuring electrode and a reference electrode.

When the titration curve derived from the manual titration of sample and titrating agent is known, the operating point of a continuous-cycle titrator can be adjusted to the end point of titration. If a measuring chain potential deviating from the selected operating point is detected by the measuring chain after this adjustment has been made in the continuous titration of this chemical system, this is indicative of the fact that the titrated sample no longer corresponds to the ideal concentration value. The concentrations can then be automatically corrected with conventional control engineering facilities.

Many chemical compounds give rise to the formation of gasses. Thus in titrating hydrogen peroxide with sodium hypochlorite there is a release of oxygen:

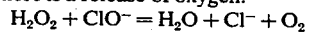

Similarly in the titration of nitrites with amidosulphonic acid, nitrogen is given off:

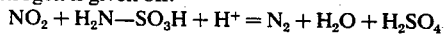

This means that when the sample to be analyzed is mixed with the titrating agent there is a vigorous evolution of gas. This evolution of gas gives rise to complications in measurement, particularly in cases where the mixture flows through the potentiometric measuring chain in small-diameter pipes. The possibility of delivering the mixture to an open measuring beaker to permit degassification cannot be considered because of the undesirable time delay in the analysis process.

The measurement of potential of the titrated sample which is preferably carried out in small-diameter pipes in the interest of a short time delay is adversely affected by the fact that gas bubbles in the mixture cause a break in the necessary conductive connection between the active part of the indicator electrode and the diaphragm of the reference electrode. Unfortunately, this is accompanied by an excessive increase in the internal resistance of the measuring chain which in turn gives rise to considerable fluctuations in potential not related to the composition of the sample to be monitored. Such fluctuations in potential are highly undesirable particularly in automatic analyzing systems where a regulator is provided to automatically correct any differences in concentration, since unnecessary concentration changes will be initiated.

BRIEF SUMMARY OF THE INVENTION

It is with the above considerations in mind that the present improved potential measurement technique has been evolved particularly adapted for use in continuous solution monitoring processes particularly in titrated samples of the solution to be analyzed to provide for potential measurements which are not affected by gas accumulations in the titrated samples of the solution under analysis.

It is accordingly among the primary objects of the invention to provide improved means for eliminating the problem of gas accumulation present in samples of solutions being analyzed by potentiometric analysis techniques.

Another object is to provide improved potential measuring apparatus for use in analyzing solution concentrations.

A further object is to minimize time delays in potentiometric analysis of solutions.

These and other objects of the invention which will become hereafter apparent are achieved by feeding the sample of the solution to be analyzed along connected upper and lower flow paths and measuring the potential at two separate points in the lower flow path. This is preferably accomplished by providing a closed measuring chamber of small volume through which the mixture of sample and titrating agent flows. The chamber is formed with an upper and lower flow path connected by two vertically adjacent separated ducts and at the inlet end by an uptake. Each of the ducts contains a measuring electrode. In this way, most of the gas bubbles are separated from the stream of liquid at the uptake. By virtue of their buoyancy, the gas bubbles float upwards and pass through the upper flow path, while a continuous flow of relatively gas free liquid passes through the lower duct. Accordingly, the electrodes projecting through the ducts into this lower flow path are located in a continuous stream of liquid, thus guaranteeing continuity of the measurement of potential.

BRIEF DESCRIPTION OF THE DRAWINGS

The specific details of a preferred embodiment and their mode of functioning will be particularly pointed out in clear, concise and exact terms in conjunction with the accompanying drawings wherein:

FIG. 1 is a cross-sectional elevational view through a chamber block formed in accordance with the invention;

FIG. 2 is a cross-section along line II — II of FIG. 1 with the connection to the block exploded;

FIG. 3 is a cross section along line III — III of FIG. 1;

FIG. 4 is an exploded detail of the left part of FIG. 1, or a cross-section along line IV — IV in FIG. 2.

DESCRIPTION OF PREFERRED EMBODIMENT

Referring now more particularly to the drawings, like numerals in the figures will be employed to designate like parts.

The apparatus illustrated comprises a prismatic chamber block 1 with an upper horizontal duct forming upper flow path 2 and a lower horizontal duct forming flow path 3. Pipes 5 are joined to these chamber flow paths by means of bushings 4, so that liquid can flow in from the left and flow off to the right. Chamber flow paths 2 and 3 are connected by vertical uptakes, the first uptake 8, is arranged at the liquid inlet. Another two vertical bores are provided to accommodate electrodes, a measuring electrode 6 being inserted in the bore following the first uptake 8, and a reference electrode 7 in the next or downstream bore. The electrodes extend down to the bottom of the lower flow path 3. The bores for the electrodes are sufficiently wide as to permit fluid flow between the electrodes and the bores from lower flow path 2 to upper flow path 3 so that the liquid flowing along the lower flow path 3 is able to rise. This insures that the electrodes 6, 7 always have liquid circulating around them, with the result that the measuring chain provides true measurements corresponding to the actual state of the liquid.

The specific details of a preferred mode of forming chamber block 1 are illustrated in the cross-sectional views of FIGS. 2–4, where FIG. 2 illustrates how uptake 8 and the vertical ducts or bores for electrodes 6 and 7 are formed. Thus the bottom of block 1 beneath uptake 8 is shown as formed with threaded bore 82 with a countersink 80. Threaded stud 81 and O-ring 83 may then be employed to seal the bottom of the chamber block 1 after bore 8 is drilled.

Assembly of the electrodes 6 and 7 with chamber block 1 is preferably obtained as illustrated in FIGS. 1 and 3, by forming the electrodes 6 and 7 with studs 60 and 70, packings 61 and 71, and electrical terminal connectors 64 and 74 respectively. As seen in FIG. 3 the electrode studs, stud 70 being illustrated, is threaded for insertion into threaded bore 73 of block 1, with packing provided by O-ring 71.

Connection of pipes or tubes 5 from the fluid system is provided as shown in FIG. 4 by means of threaded nipple 4 engaging threads 42 which terminate against shoulder 44, the threads 42 having a pitch diameter larger than that of flow path 3 so that the internal diameter of the nipple 5 may correspond to that of the tubing 5 to which the nipple 4 is connected, and the nipple 4 may be securely seated in the block 1. As illustrated in FIG. 4 it is preferred that the internal diameter of the flow path adjacent the point of entry to the channel block (at the left as viewed in FIGS. 1 and 4) be slightly larger than the internal diameter of the nipples so that there is a turbulence produced in the fluid flow into the chamber block 1.

OPERATION

In use the block 1 is arranged in the fluid system of the analyzing equipment to receive a titrated sample of the solution to be analyzed.

The solution filled with gas bubbles flowing into block 1 from the left passes the vertical uptake 8 through which the gas bubbles present in the lower flow path 3 rise upwards and continue flowing through the upper flow path 2. As a result, the solution flowing to the right in the lower flow path 3 is relatively bubble-free and the electrodes 6, 7 are located in a continuous column of liquid, so that fluctuations in potential in the measuring circuit are avoided because there are no changes in the internal resistance of the measuring chain. When the solution emerges, i.e. after it has passed through the measuring chain, the two component or branch streams recombine.

What is claimed is:

1. Means for measuring potential of a fluid sample, said means comprising: a chamber having an upper fluid flow path separated from a lower fluid flow path along which paths the sample of the fluid if flowed; an uptake between said flow paths; and a spaced pair of electrodes extending into the lower flow path of said chamber through ducts formed between said upper and lower flow paths, said ducts being of a dimension to permit the free flow of fluid over said electrodes from said lower flow path to said upper flow path.

2. Means as in claim 1 in which the first of said electrodes encountered by the fluid flowing along said lower flow path is a measuring electrode, and the second of said pair of electrodes is spaced downstream of said first electrode and is a reference electrode.

3. Means as in claim 1 in which said chamber is coupled to a fluid flow system to receive the sample by a nipple having an internal diameter less than the diameter of said flow paths.

* * * * *